United States Patent
Seo

(10) Patent No.: US 7,523,328 B2
(45) Date of Patent: Apr. 21, 2009

(54) COMPUTER POWER CONTROL

(75) Inventor: Kwang-youn Seo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 394 days.

(21) Appl. No.: 11/244,004

(22) Filed: Oct. 6, 2005

(65) Prior Publication Data
US 2006/0075270 A1  Apr. 6, 2006

(30) Foreign Application Priority Data
Oct. 6, 2004  (KR) .................. 10-2004-0079709

(51) Int. Cl.
G06F 1/00 (2006.01)
G06F 1/26 (2006.01)
G06F 1/32 (2006.01)

(52) U.S. Cl. ................. 713/320; 713/321; 713/323

(58) Field of Classification Search ............... 713/320
See application file for complete search history.

(56) References Cited

U.S. PATENT DOCUMENTS 6,678,831 B1  1/2004  Mustafa et al.
2003/0009702 A1*  1/2003  Park .................. 713/300

FOREIGN PATENT DOCUMENTS

| JP | 07-5948 | 1/1995 |
|---|---|---|
| JP | 10-207583 | 8/1998 |
| JP | 11-065718 | 3/1999 |
| KR | 1019940003609 B1 | 4/1994 |
| KR | 2002-0025756 | 4/1998 |
| KR | 1998-0083401 | 12/1998 |
| KR | 100245199 B1 | 11/1999 |
| KR | 2000-0008712 | 2/2000 |
| KR | 2003-0008060 | 1/2003 |

OTHER PUBLICATIONS

Korean Office Action issued Feb. 9, 2006.
Korean Office Action Issued Apr. 27, 2006.

* cited by examiner

Primary Examiner—Thomas Lee
Assistant Examiner—Michael J Brown
(74) Attorney, Agent, or Firm—Staas & Halsey LLP

(57) ABSTRACT

A computer including a CPU, a power output unit to output driving power needed for driving the CPU, a CPU state output unit to output a first state information signal when it is detected that the CPU is driven in a power saving mode, a signal switching unit to output the second state information signal when the first state information signal is maintained beyond a predetermined reference time, and a PWM control unit to control the power output unit to output the driving power having a first level corresponding to the power saving mode upon receipt of the second state information signal from the signal switching unit. Thus, embodiments of the present invention set forth a computer reducing the generation of noise from a power management of a CPU.

16 Claims, 6 Drawing Sheets

COMPUTER POWER CONTROL

CROSS-REFERENCE TO RELATED APPLICATIONS

This application claims the priority benefit of Korean Patent Application No. 2004-0079709, filed on Oct. 6, 2004, in the Korean Intellectual Property Office, the disclosure of which is incorporated herein by reference.

BACKGROUND OF THE INVENTION

1. Field of the Invention

Embodiments of the present invention relate to a computer, and more particularly, to a computer producing reduced noise during a power saving mode.

2. Description of the Related Art

ACPI (Advanced Configuration and Power Interface) is an open solution, generally implemented in computer hardware, operation systems, software, and peripheral device interfaces. This feature assists operating systems, hardware, and peripheral devices, e.g., those developed by Intel Inc., Microsoft, and Toshiba, to communicate with one another during power utilization.

In a conventional computer, the power management system operates according to a basic input/output system (BIOS), such that portions of the computer should implement a given non-operation period prior to disconnection from a power supply. A main object of the ACPI is to enable OS assisting Operating System Directed Power Management (OSPM) to manage all power activities, thereby providing the respective portions of the computer with power only when power is needed.

The ACPI, as announced in 1996, defines states C0, C1, C2, and C3 as power states of a CPU, with the C0 state being defined as a normal state, the C1 state being a halt state, the C2 state being a stop-grant state, and the C3 state being a stop clock state.

In the C2 state, the CPU performs a minimum level of activity, such as the snooping in order to keep a cache relationship. In the C3 state as the deep sleep mode, the CPU does not receive an external clock, so substantially all of the activities of the processor, except for a function to maintain data stored in a cache memory in the CPU, are not operational. Thus, in the C3 state deep sleep mode, less power is consumed compared to in the C2 state.

In recent years, Intel Inc. has developed Intel mobile voltage positioning II (IMVP II) in improved voltage regulation technology, such that a state C4 is introduced as a new power state of the CPU, being a deeper sleep mode than the C3 state deep sleep mode, and lowering a driving voltage when the CPU is not operating so as to reduce power dissipation.

FIG. 1 illustrates a computer with a conventional power supply system.

Referring to FIG. 1, a power supply module 140 provides a CPU 110 with driving power required to drive the CPU 110, i.e. a core voltage, converted from power supplied from an adapter or a battery, for example.

Here, the CPU 110 may have capabilities the same as or higher than Pentium Pro of Intel Inc., for example, and may require various levels of the core voltage (Vcore), depending on the type of CPU 110. The CPU 110 can provide the power supply module 140 with information about the Vcore level required through a voltage identification (VID) cord whose value range from 0 to 4 (VID [0, 4]), for example, and thereafter receive the Vcore having the required level.

In addition, the power supply module 140 can receive a state information signal including information of the driving mode of the CPU 110, provided from an input/output control hub, and may provide the Vcore to the CPU 110 with the corresponding level indicated in the state information signal. For example, when a state information signal, corresponding to the C4 state deeper sleep mode (DPRSLP), is received, a PWM control unit 150 in the power supply module 140 can control a power output unit 160 to provide the CPU 110 with a Vcore having a lower voltage level, e.g., 0.85V, than the voltage level for a normal state, which may be any value from 1.05V to 1.15V, for example.

Meanwhile, the power output unit 160 in the power supply module 140 can include various electric elements. For example, the power output unit 160 may include several ceramic capacitors, transistors for switching elements, inductors and the like.

However, in a conventional computer, when power is managed based on the driving state of the CPU 110, in order to perform power management, noise results from the power output unit 160, and in particular, noise is generated by the electric elements, e.g., ceramic capacitors and/or inductors, based on the change of the state information signal output from the input/output control hub. For example, upon the change of a logical value of a signal representing the deeper sleep mode is beyond several KHz, the generated noises resulting from the power output unit 160 are also beyond several KHz.

Furthermore, when a normal state power level is switched to a power saving mode, e.g., the deeper sleep mode, the voltage level of the Vcore will abruptly change. Such an abrupt change of voltage level may generate noise in the power output unit 160.

SUMMARY OF THE INVENTION

Accordingly, it is an aspect of the present invention to provide a computer having reduced noise resulting from a power management of a CPU.

To achieve the above and/or other aspects and advantages, embodiments of the present invention include a computer, including a CPU, a power output unit to output driving power to drive the CPU, a CPU state output unit to output a first state information signal based upon a detection that the CPU is driven in a power saving mode, a signal switching unit to output a second state information signal when the first state information signal is maintained beyond a predetermined reference time, and a PWM control unit to control the power output unit to output the driving power with a first level corresponding to the power saving mode upon receipt of the second state information signal from the signal switching unit.

The power saving mode may include a deeper sleep mode defined an ACPI standard. In addition, the PWM control unit may control the power output unit to output the driving power having a second level corresponding to a normal mode of the CPU when the second state information signal from the signal switching unit is not received by the PWM control unit.

The computer may further include a slew rate control unit to control the PWM control unit to reduce a corresponding slew rate when the driving power output from the power output unit is changed from the second level to the first level in response to receipt of the second state information signal to the PWM control unit. Further, the computer may include a function selection unit to select whether the slew rate control unit operates. The function selection unit may also control the slew rate control unit to operate when the CPU operates in a high frequency mode, and controls the slew rate control unit to not operate when the CPU operates in a low frequency mode.

Whether the CPU operates in the high frequency mode and the low frequency mode may also be determinable by the function selection unit based on a VID cord output from the CPU to the PWM controller.

To achieve the above and/or other aspects and advantages, embodiments of the present invention include a power control method, including outputting a driving power to drive a CPU, determining whether the CPU is driven in a power saving mode and outputting a first state information signal based upon the power saving mode determination, determining whether the first state information signal is maintained beyond a predetermined reference time and outputting a second state information signal based upon the first state information signal maintenance determination, and controlling the outputting of the driving power to output the driving power at a first level corresponding to the power saving mode upon receipt of the second state information signal from the signal switching unit.

The controlling of the outputting of the driving power may further include controlling the output of the driving power to output the driving power at a second level corresponding to a normal mode of the CPU when the second state information signal is not output upon the first state information signal maintenance determination. The controlling of the outputting of the driving power may further include controlling a corresponding slew rate of the driving power when the driving power changes from the second level to the first level in response to the outputting of the second state information signal.

The slew rate controlling may be performed when the CPU operates in a high frequency mode, and the slew rate controlling is not performed when the CPU operates in a low frequency mode. In addition, the method may further include determining whether the CPU operates in the high frequency mode and the low frequency mode based on a VID cord output from the CPU.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
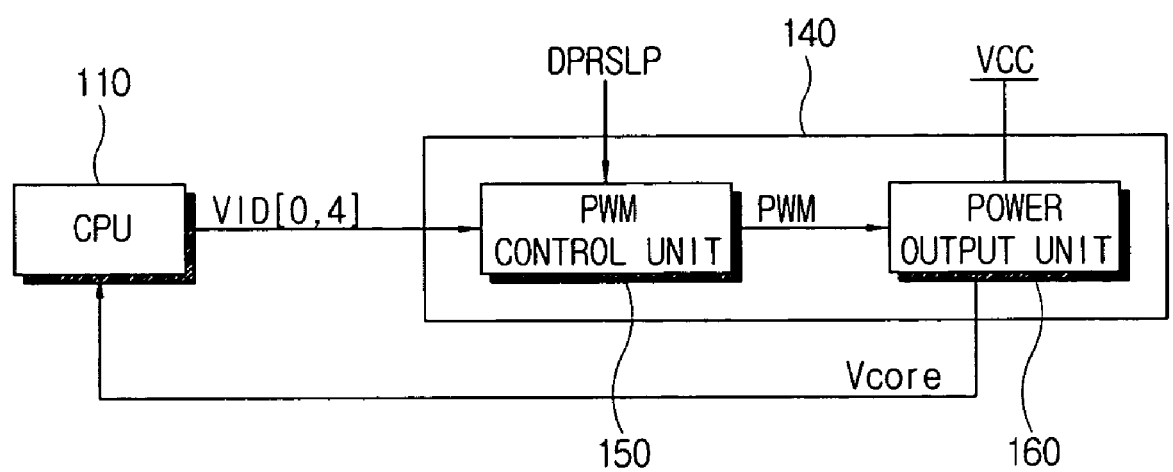
FIG. 1 illustrates a computer with a power supply system.

Reference will now be made in detail to embodiments of the present invention, examples of which are illustrated in the accompanying drawings, wherein like reference numerals refer to like elements throughout. Embodiments are described below in order to explain the present invention by referring to the figures.

Figure 2:
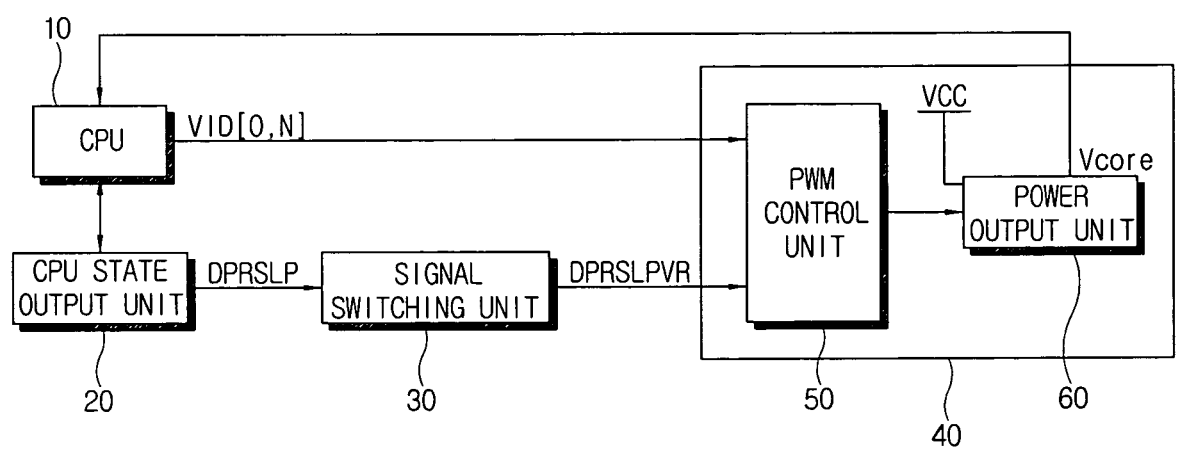
FIG. 2 illustrates a control block diagram of a computer, according to an embodiment of the present invention.

As shown in FIG. 2, a computer may include a CPU 10, a CPU state output unit 20, a signal switching unit 30, and a power supply module 40, according to an embodiment of the present invention.

The CPU 10 may be driven by a received core voltage (Vcore) for driving power from the power supply module 40, for thereby performing an operation or data processing. Here, the CPU 10 can generate a voltage identification (VID) cord, whose value may range from 0 to N (VID [0, N]), for example, for identifying a Vcore level required by the CPU 10, such that the generated VID cord is output to the power supply module 40.

The power supply module 40 may include a power output unit 60 to output the Vcore, and a PWM control unit 50 to control a level of the Vcore output from the power output unit 60, based on the VID cord (VID [0, N]) of the CPU 10.

The CPU state output unit 20 can output a first state information signal DPRSLP when the CPU state output unit 20 detects that the CPU 10 is driven in a power saving mode. Here, the power saving mode of the CPU 10 may include a deeper sleep mode, i.e., the aforementioned state C4, according to the ACPI standards, for example. Here, the power saving mode of CPU 10 can also be applied for power saving modes under other standards, upon a level of the Vcore supplied to the CPU 10 being changed, based upon on a power state of the CPU 10.

According to an embodiment of the present invention, the CPU state output unit 20 can include an input/output control hub (ICH), such as a chipset made by Intel Inc., or a South Bridge, for example.

The signal switching unit 30 can output a second state information signal DPRSLPVR when the first state information signal DPRSLP is maintained beyond a predetermined reference time period. Here, the second state information signal DPRSLPVR, output from the signal switching unit 30, can be transmitted to the PWM control unit 50 in the power supply module 40. The PWM control unit 50, when the second state information signal DPRSLPVR is transmitted, then controls the power output unit 60 to output a Vcore having a first level corresponding to the power saving mode of the CPU 10.

Meanwhile, when the second state information signal DPRSLPVR is not transmitted, the PWM control unit 50 can control the power output unit 60 to output a Vcore having a second level corresponding to a normal mode of the CPU 10. Therefore, the second level of the Vcore output from the power output unit 60 may be higher than the first level of the Vcore.

Hereinafter, a computer according to an embodiment of the present invention will be described with reference to FIG. 3.

The PWM control unit 50, in the power supply module 40, may transmit a PWM signal to the power output unit 60, controlling a level of the Vcore to be output from the power output unit 60. The power output unit 60 may include a first MOS transistor T1, a second MOS transistor T2, a drive IC 51 to turn on/off the first MOS transistor T1 and the second MOS transistor T2 based on the PWM signal from the PWM control unit 50, an inductor I, and a capacitor(s) Ca.

The first MOS transistor T1 can have a current path formed between a power voltage Vcc from a power source and a node, and a gate to be controlled by a control signal output from the drive IC 51. The second MOS transistor T2 can have a current path formed between the node and a ground voltage, and a gate to be controlled by a control signal output from the drive IC 51. In addition, the inductor I may be connected in series between the node and an output terminal, with the capacitor Ca being connected between an output side of the inductor I and the ground voltage.

The signal switching unit 30 can include an RC relay circuit, which may include a first diode D1 and a first resistor R1, in parallel, and connected to a input terminal inputting the first state information signal DPRSLP output from the CPU state output unit 20, and a first capacitor C1, in parallel with the first resistor R1. In addition, an output terminal of the RC relay circuit may be connected to a varistor B or a diode, as illustrated in FIG. 3.

Figure 4:
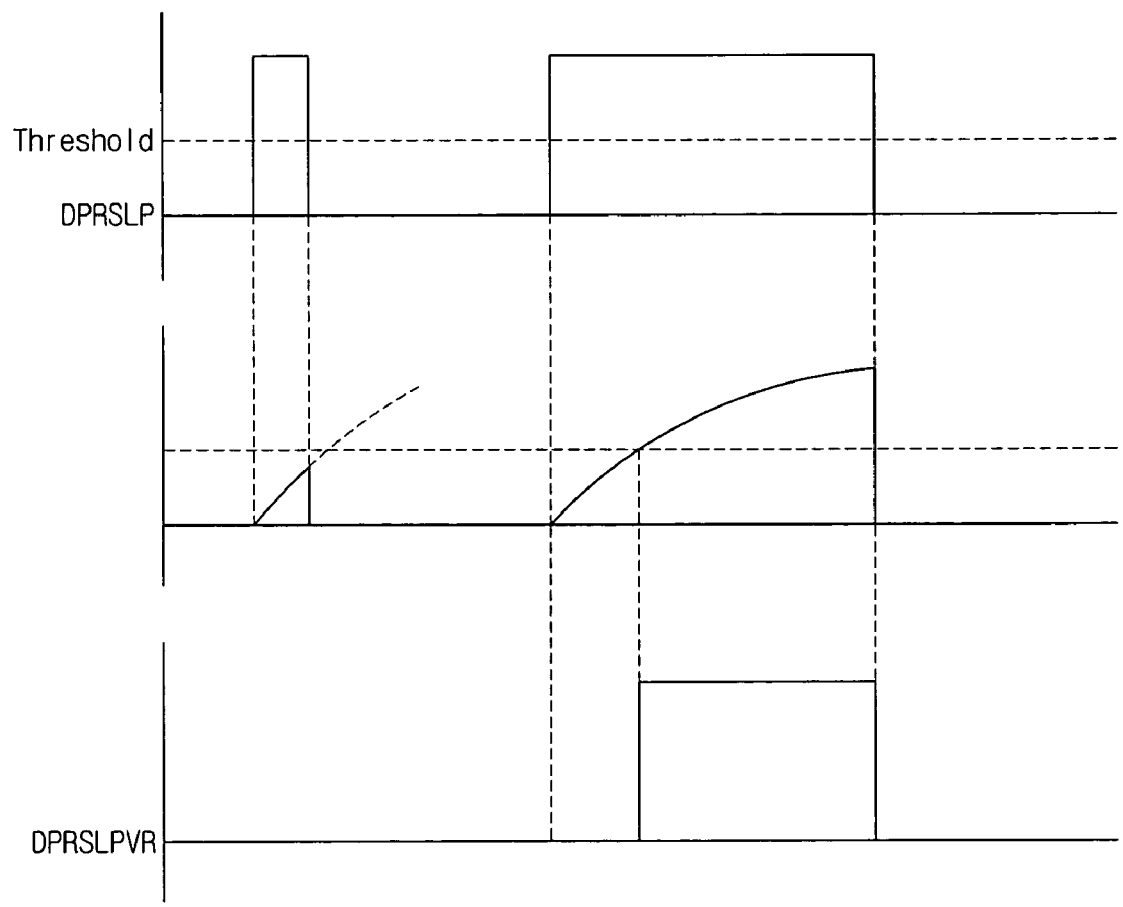
FIG. 4 illustrates a relationship between a first state information signal and a second state information signal of a computer, according to an embodiment of the present invention.

FIG. 4 graphically illustrates a relationship between a first state information signal DPRSLP output from the CPU state output unit 20 and a second state information signal DPRSLPVR output from the signal switching unit 30. As shown in FIG. 4, the CPU state output unit 20 outputs the first state information signal DPRSLP with a higher level when the CPU 10 is determined to be in a power saving mode, e.g., the aforementioned deeper sleep mode. Here, when the first state information signal DPRSLP is input to the signal switching unit 30, the first capacitor C1 can be charged with the first state information signal passed through the first resistor R1, and thus, a voltage applied to the input terminal side of the varistor B may be gradually increased.

At this time, when the first state information signal DPRSLP has been maintained beyond a predetermined relay time, such that the voltage of the input terminal of the varistor B has increased beyond a threshold voltage, varistor B can be connected, and thus, the second state information signal DPRSLPVR can be output from the signal switching unit 30.

Meanwhile, when the first state information signal DPRSLP has not been maintained beyond the predetermined relay time, varistor B is not connected, and thus, the second state information signal DPRSLPVR is not output from the signal switching unit 30. Thus, even if the CPU 10 enters into a power saving mode, so that the CPU state output unit 20 outputs the first state information signal DPRSLP, the power supply module 40 keeps the power voltage to a level corresponding to a normal mode of the CPU 10 when the power saving mode of the CPU 10 is not indicated as being maintained beyond the relay time. That is, when a change between a normal mode and a power saving mode, of the CPU 10, is over a predetermined frequency, the driving state of the CPU 10 is kept in the normal state, to reduce the generation of noise from the power supply module 40 resulting from the abrupt mode change.

Figure 5:
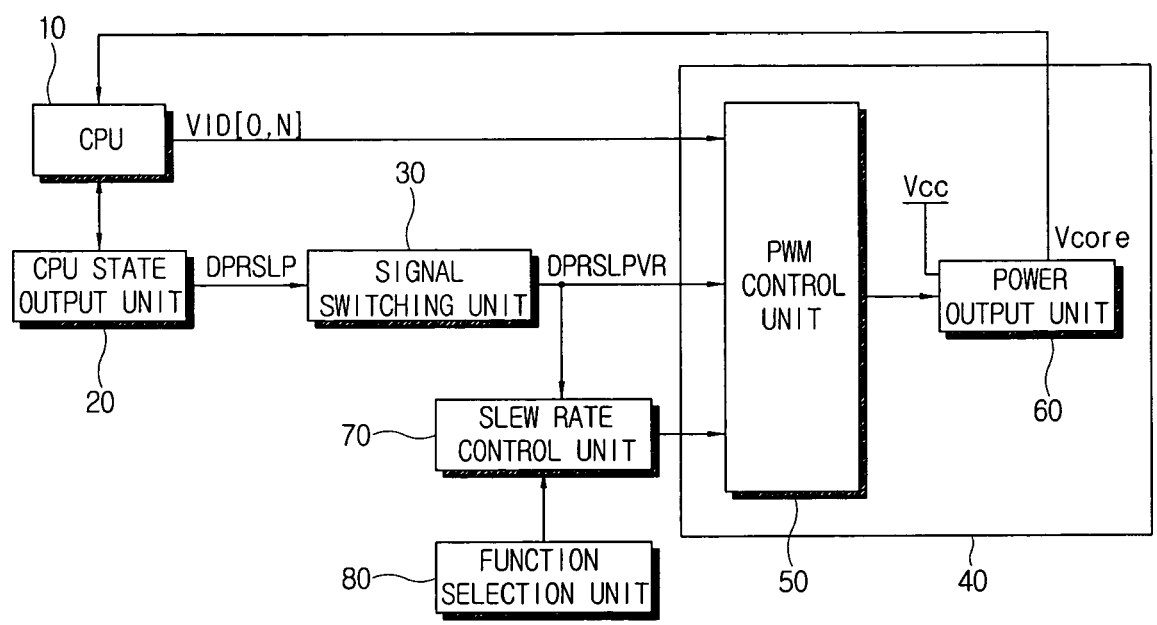
FIG. 5 illustrates a control block diagram of a computer, according to another embodiment of the present invention.

FIG. 5 illustrates a control block diagram of a computer, according to another embodiment of the present invention. As shown in FIG. 5, the computer may include the CPU 10, the CPU state output unit 20, the signal switching unit 30, and the power supply module 40. In addition, the computer may further include a slew rate control unit 70 and a function selection unit 80.

The slew rate control unit 70 can control the PWM control unit 50 to reduce a slew rate when the Vcore, output from the power output unit 60, is changed from a second level to a first level. Here, the slew rate control unit 70 can reduce the slew rate when the second state information signal DPRSLPVR, output from the CPU state output unit 20, so that the PWM control unit 50 changes the voltage level of the Vcore, output from the power output unit 60, from the second level to the first level.

Thus, the Vcore output from the power output unit 60, based on a mode change of the CPU 10, can be prevented from abruptly changing, and thereby reducing noise from being generated from the circuit elements upon an abrupt change of voltage.

The function selection unit 80 can select whether the slew rate control unit 70 operates. Here, when the CPU 10 operates in a high frequency mode, the function selection unit 80 can control the slew rate control unit 70 to operate, and when the CPU 10 operates in a low frequency mode, the function selection unit 80 can control the slew rate control unit 70 to stop operating.

Generally, the CPU 10 can operate in the low frequency mode when power is supplied by a battery, and operate in the high frequency mode when power is supplied by a adapter connected to an external power supply. When the CPU 10 operates in the low frequency mode, and even when an operation state of the CPU 10 is changed from the normal mode to the power saving mode so that the level of the Vcore output from the power output unit 60 is changed, the variation of the change is minimized to thereby reduce the generation of noise. Therefore, the slew rate control unit 70 can be controlled to stop operating when the CPU 10 operates in the low frequency mode. Meanwhile, in an example of the CPU 10 operating in the high frequency mode, even when power is supplied to the CPU 10 by a battery, the CPU 10 can operate in the high frequency mode when a power management of the operating system is set as "sustaining power on mode," for example.

Here, the function selection unit 80 may determine whether the CPU 10 operates in the high frequency mode or the low frequency mode based on the VID cord, whose value can range from 0 to N, for example, as input from the CPU 10 to the PWM control unit 50. For example, a fifth line of the VID cord of the CPU 10 may set a logical value corresponding to the determined mode. Therefore, the function selection unit 80 may be connected with the fifth line of the VOD cord to receive the logical value, for example.

Hereinafter, a computer according to another embodiment of the present invention will be described with reference to FIG. 6.

The slew rate control unit 70 can include a second resistor R2, connected with a node between the output terminal of the signal switching unit 30 and the input terminal of the PWM control unit 50, a second capacitor C2, and a third resistor R3. Further, an output terminal of the third resistor R3 can be connected with a VOA-terminal of the PWM control unit 50. Here, the PWM control unit 50 can change a voltage level of the Vcore output from the power output unit 60 in proportion to a voltage level of the VOA-terminal.

The function selection unit 80 may include a fourth resistor R4 connected with a node between the second resistor R2 of the slew rate control unit 70 and the second capacitor C2 of the slew rate control unit 70, and switching unit 81.

The switching unit 81 may be turned off when the CPU 10 operates in the low frequency mode, while the switching unit 81 may be turned on when the CPU 10 operates in the high frequency mode, based on the logical value from the fifth line, for example, of the VID cord. Thus, the fourth resistor R4 may be connected in parallel with the second resistor R2 or disconnected, for example.

Here, operations of the slew rate control unit 70 and the function selection unit 80 will be described in greater detail.

When the signal switching unit 30 outputs the second state information signal DPRSLPVR, the second state information signal DPRSLPVR may be transmitted to the PWM control unit 50 and the slew rate control unit 70. Here, operations when the second state information signal DPRSLPVR is transmitted to the PWM control unit 50 can be the same as foregoing embodiments.

At that time, when the CPU 10 operates in the low frequency mode, the switching unit 81 can be turned off so that a parallel connection between the fourth resistor R4 and the second resistor R2 is disconnected. Thus, the voltage level of the second state information signal DPRSLPVR, transmitted to the second capacitor C2 and the third resistor R3, may be maintained at the current voltage level.

On the other hand, when the CPU 10 operates in the high frequency mode, the switching unit 81 can be turned on so that the fourth resistor R4 and the second resistor R2 are connected in parallel. Thus, a voltage of the second state information signal DPRSLPVR can be divided by the fourth resistor R4 and the second resistor R2, so that a voltage having a predetermined level is supplied to the second capacitor C2 and the third resistor R3, and so that a voltage level of a voltage transmitted to the VOA-terminal can be gradually reduced. Thus, the PWM control unit 50 can gradually reduce the voltage level of the Vcore output from the power output unit 60 based on the voltage level transmitted to the VOA-terminal.

Therefore, when the CPU 10 is changed from the normal mode to the power saving mode, while operating in the high frequency mode, the slew rate can be decreased with regard to the level change of the core voltage outputted from the CPU 10, thereby reducing the generation of noise based on abrupt changes of the voltage.

Figure 3:
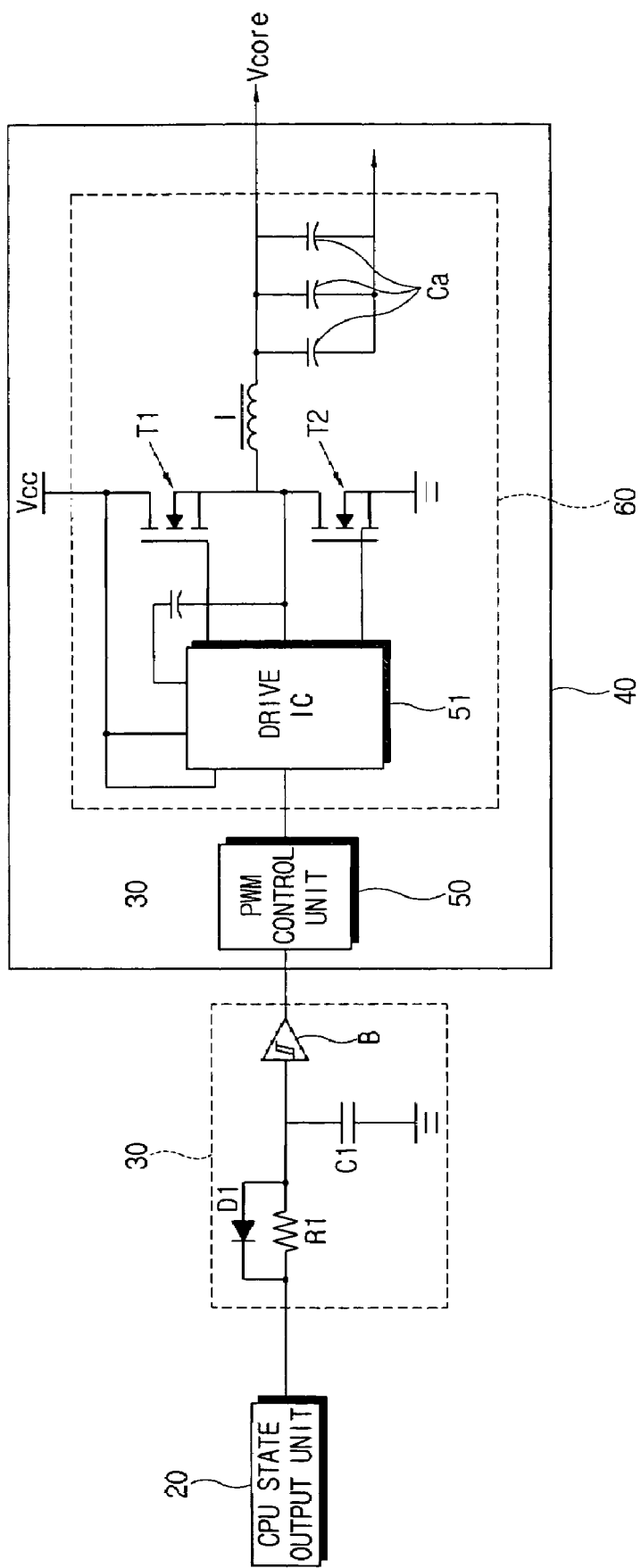
FIG. 3 illustrates a detailed control block diagram of a computer, according to an embodiment of the present invention.
Figure 6:
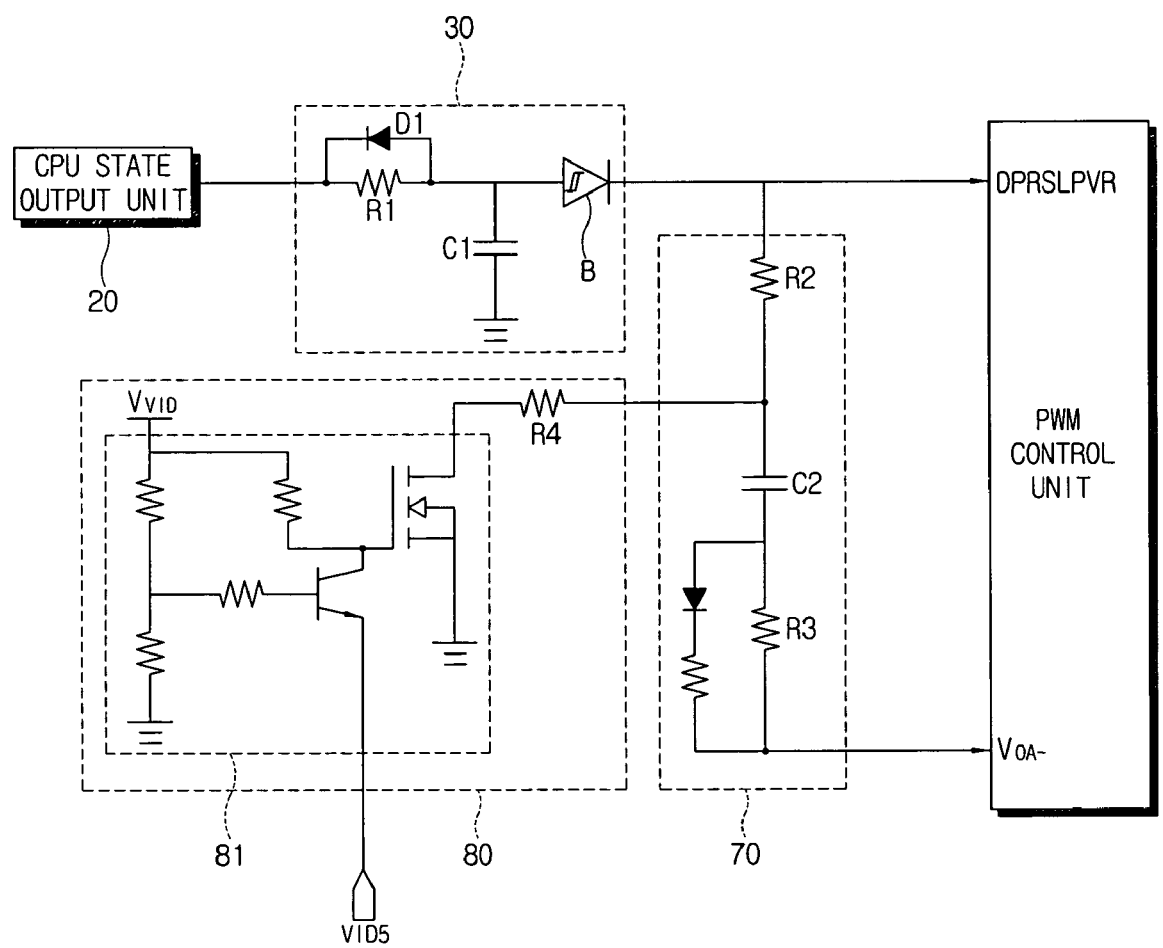
FIG. 6 illustrates a detailed control block diagram of a computer, according to still another embodiment of the present invention.

FIGS. 3 and 6 illustrate circuit configurations including the signal switching unit 30, the slew rate control unit 70, and the function selection unit 80, for example. Alternatively, other circuit configurations may be possible without departing from the principles and spirit of the invention as long as they accomplish functions of the signal switching unit 30, the slew rate control unit 70, and/or the function selection unit 80.

In an embodiment of the present invention, the switching unit 81 of the function selection unit 80 can be turned on/off by the VID cord (VID [0, N]) output from the CPU 10. Alternatively, the switching unit of the function selection unit may be turned on/off by a control signal output from other signal sources which may indicate whether the CPU 10 operates in the high frequency mode or the low frequency mode. For example, the switching unit of the function selection unit can be turned on/off by a control signal output from a microcomputer, used for a power management chipset, may check whether the power is supplied from an battery or adapter from an external power source.

Thus, in embodiments of the present invention, the a power output unit 60 may output driving power needed for driving the CPU 10, the CPU state output unit 20 may output the first state information signal DPRSLP when it is detected that the CPU 10 is driven in the power saving mode, the signal switching unit 30 may output the second state information signal DPRSLPVR when the first state information signal DPRSLP is maintained beyond a predetermined reference time, and the PWM control unit 50 may control the power output unit 60 to output the driving power having a first level corresponding to a power saving mode when receiving a second state information signal DPRSLPVR, thereby reducing the generation of noise from the power management of the CPU.

As described above, embodiments of the present invention may set forth a computer reducing the generation of noise the power management for a CPU.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A computer, comprising:
a CPU;
a power output unit to output driving power to drive the CPU;
a CPU state output unit to output a first state information signal based upon a detection that the CPU is driven in a power saving mode;
a signal switching unit to output a second state information signal when the first state information signal is maintained beyond a predetermined reference time; and
a PWM control unit to control the power output unit to output the driving power with a first level corresponding to the power saving mode upon receipt of the second state information signal from the signal switching unit.

2. The computer of claim 1, wherein the power saving mode includes a deeper sleep mode defined an ACPI standard.

3. The computer of claim 2, wherein the PWM control unit controls the power output unit to output the driving power having a second level corresponding to a normal mode of the CPU when the second state information signal from the signal switching unit is not received by the PWM control unit.

4. The computer of claim 3, further comprising a slew rate control unit to control the PWM control unit to reduce a corresponding slew rate when the driving power output from the power output unit is changed from the second level to the first level in response to receipt of the second state information signal to the PWM control unit.

5. The computer of claim 4, further comprising a function selection unit to select whether the slew rate control unit operates.

6. The computer of claim 5, wherein the function selection unit controls the slew rate control unit to operate when the CPU operates in a high frequency mode, and controls the slew rate control unit to not operate when the CPU operates in a low frequency mode.

7. The computer of claim 5, whether the CPU operates in the high frequency mode and the low frequency mode is determinable by the function selection unit based on a VID cord output from the CPU to the PWM controller.

8. The computer of claim 1, wherein the CPU state output unit outputs the first state information to the signal switching unit.

9. A power control method, comprising:
outputting a driving power to drive a CPU;
determining whether the CPU is driven in a power saving mode and outputting a first state information signal based upon the power saving mode determination;
determining whether the first state information signal is maintained beyond a predetermined reference time and outputting a second state information signal based upon the first state information signal maintenance determination; and
controlling the outputting of the driving power to output the driving power at a first level corresponding to the power saving mode upon receipt of the second state information signal.

10. The method of claim 9, wherein the power saving mode includes a deeper sleep mode defined an ACPI standard.

11. The method of claim 10, wherein the controlling of the outputting of the driving power further comprises controlling the output of the driving power to output the driving power at a second level corresponding to a normal mode of the CPU when the second state information signal is not output upon the first state information signal maintenance determination.

12. The method of claim 11, wherein the controlling of the outputting of the driving power further comprises controlling a corresponding slew rate of the driving power when the driving power changes from the second level to the first level in response to the outputting of the second state information signal.

13. The method of claim 12, further comprising selecting whether the controlling of the slew rate is performed.

14. The method of claim 13, wherein the slew rate controlling is performed when the CPU operates in a high frequency mode, and the slew rate controlling is not performed when the CPU operates in a low frequency mode.

15. The method of claim 13, further comprising determining whether the CPU operates in the high frequency mode and the low frequency mode based on a VID cord output from the CPU.

16. The method of claim 9, wherein the outputting of the second state information signal is based upon a receipt of the first state information signal and the determination of whether the received first state information signal is maintained beyond the predetermined reference time.

* * * * *